(12) United States Patent
Ryu et al.

(10) Patent No.: US 11,444,272 B2
(45) Date of Patent: Sep. 13, 2022

(54) POSITIVE ELECTRODE INCLUDING ROOM TEMPERATURE SOLID STATE PLASTICIZER, AND SOLID ELECTROLYTE BATTERY INCLUDING THE SAME

(71) Applicant: LG Chem, Ltd., Seoul (KR)

(72) Inventors: Ji-Hoon Ryu, Daejeon (KR); Jung-Pil Lee, Daejeon (KR); Sung-Joong Kang, Daejeon (KR); Eun-Bee Kim, Daejeon (KR); Hyo-Sik Kim, Daejeon (KR); Suk-Woo Lee, Daejeon (KR); Jae-Hyun Lee, Daejeon (KR)

(73) Assignee: LG Energy Solution, Ltd.

( * ) Notice: Subject to any disclaimer, the term of this patent is extended or adjusted under 35 U.S.C. 154(b) by 191 days.

(21) Appl. No.: 16/648,116

(22) PCT Filed: Apr. 10, 2019

(86) PCT No.: PCT/KR2019/004300
§ 371 (c)(1),
(2) Date: Mar. 17, 2020

(87) PCT Pub. No.: WO2019/208958
PCT Pub. Date: Oct. 31, 2019

(65) Prior Publication Data
US 2020/0251714 A1    Aug. 6, 2020

(30) Foreign Application Priority Data
Apr. 26, 2018    (KR) .......... 10-2018-0048584

(51) Int. Cl.
*H01M 4/13* (2010.01)
*H01M 4/62* (2006.01)
(Continued)

(52) U.S. Cl.
CPC .............. *H01M 4/13* (2013.01); *H01M 4/62* (2013.01); *H01M 10/0525* (2013.01); *H01M 10/0565* (2013.01); *H01M 2004/028* (2013.01)

(58) Field of Classification Search
CPC ...... H01M 4/13; H01M 4/62; H01M 10/0565; H01M 10/0525
(Continued)

(56) References Cited

U.S. PATENT DOCUMENTS

| | | |
|---|---|---|
| 5,720,780 A | 2/1998 | Liu et al. |
| 6,365,300 B1 | 4/2002 | Ota et al. |

(Continued)

FOREIGN PATENT DOCUMENTS

| | | | |
|---|---|---|---|
| CN | 2062501 U | * 9/1990 | ............. Y02E 60/12 |
| CN | 1037728 C | * 3/1998 | .......... H01M 10/052 |

(Continued)

OTHER PUBLICATIONS

Extended European Search Report including Written Opinion for Applicaton No. EP19793056 dated Jan. 15, 2021, 7 pgs.
(Continued)

*Primary Examiner* — Sean P Cullen
(74) *Attorney, Agent, or Firm* — Lerner, David, Littenberg, Krumholz & Mentlik, LLP

(57) ABSTRACT

The present disclosure relates to a positive electrode for a solid electrolyte battery which includes: a positive electrode current collector; a first positive electrode active material layer formed on at least one surface of the positive electrode current collector and including a first positive electrode active material, a first solid electrolyte and a first electrolyte salt; and a second positive electrode active material layer formed on the first positive electrode active material layer and including a second positive electrode active material, a second solid electrolyte, a second electrolyte salt and a (Continued)

plasticizer, wherein the plasticizer has a melting point of 30-130° C. The present disclosure also relates to a solid electrolyte battery including the positive electrode.

14 Claims, 2 Drawing Sheets

(51) Int. Cl.
  *H01M 10/0525* (2010.01)
  *H01M 10/0565* (2010.01)
  *H01M 4/02* (2006.01)
(58) Field of Classification Search
  USPC .......................................................... 429/217
  See application file for complete search history.

(56) References Cited

U.S. PATENT DOCUMENTS

| | | |
|---|---|---|
| 2005/0266150 A1 | 12/2005 | Yong et al. |
| 2006/0263688 A1* | 11/2006 | Guyomard ............ H01M 4/622 252/182.1 |
| 2009/0301866 A1 | 12/2009 | Zaghib et al. |
| 2013/0122333 A1 | 5/2013 | Obika et al. |
| 2013/0130075 A1 | 5/2013 | Kim et al. |
| 2015/0004486 A1 | 1/2015 | Moroishi et al. |
| 2015/0079480 A1 | 3/2015 | Ahn et al. |
| 2015/0340730 A1 | 11/2015 | Kim et al. |
| 2016/0028103 A1 | 1/2016 | Yokoyama et al. |
| 2016/0359190 A1 | 12/2016 | Teraoka et al. |
| 2018/0006291 A1 | 1/2018 | Kim et al. |
| 2020/0287245 A1 | 9/2020 | Ryu et al. |

FOREIGN PATENT DOCUMENTS

| | | |
|---|---|---|
| CN | 1759493 A | 4/2006 |
| CN | 102646811 A | 8/2012 |
| CN | 103258999 A | 8/2013 |
| CN | 104380519 A | 2/2015 |
| CN | 105304931 A | 2/2016 |
| EP | 1132987 A2 | 9/2001 |
| JP | H07240233 A | 9/1995 |
| JP | H11007980 A | 1/1999 |
| JP | 2000340257 A | 12/2000 |
| JP | 2007109636 A | 4/2007 |
| JP | 2007227362 A | 9/2007 |
| JP | 2017004672 A | 1/2017 |
| JP | 2017157529 A | 9/2017 |
| JP | 2018500714 A | 1/2018 |
| KR | 100125152 B1 | 12/1997 |
| KR | 19980019330 A | 6/1998 |
| KR | 20130041231 A | 4/2013 |
| KR | 20150133554 A | 11/2015 |
| WO | 2013002608 A2 | 1/2013 |
| WO | 2013115368 A1 | 8/2013 |
| WO | 2018180768 A1 | 10/2018 |
| WO | 2019208959 A1 | 10/2019 |

OTHER PUBLICATIONS

International Search Report for Application No. PCT/KR2019/004300 dated Jul. 19, 2019, 2 pages.
Search Report dated Jul. 28, 2022 from the Office Action for Chinese Application No. 201980004550.1 dated Aug. 3, 2022, 3 pages.

* cited by examiner

POSITIVE ELECTRODE INCLUDING ROOM TEMPERATURE SOLID STATE PLASTICIZER, AND SOLID ELECTROLYTE BATTERY INCLUDING THE SAME

CROSS-REFERENCE TO RELATED APPLICATIONS

This application is a national phase entry under 35 U.S.C. § 371 of International Application No. PCT/KR2019/004300 filed Apr. 10, 2019, which claims priority from Korean Patent Application No. 10-2018-0048584 filed Apr. 26, 2018, all of which are incorporated herein by reference.

TECHNICAL FIELD

The present disclosure relates to a positive electrode for a solid electrolyte battery, and a solid electrolyte battery including the same. More particularly, the present disclosure relates to a positive electrode for a solid electrolyte battery which can reduce the interfacial resistance between a positive electrode active material layer and a separator, while increasing the adhesion to a positive electrode current collector, and a solid electrolyte battery including the same.

BACKGROUND ART

A lithium ion battery using a liquid electrolyte has a structure in which a negative electrode and positive electrode are defined by a separator, and thus may cause a short-circuit when the separator is damaged by deformation or external impact, resulting in a risk, such as overheating or explosion. Therefore, it can be said that development of a solid electrolyte capable of ensuring safety is a very important problem in the field of lithium ion secondary batteries.

A lithium secondary battery using a solid electrolyte has enhanced safety, prevents leakage of an electrolyte to improve the reliability of a battery, and facilitates manufacture of a thin battery. In addition, lithium metal may be used as a negative electrode to improve energy density. Thus, such a lithium secondary battery using a solid electrolyte has been expected to be applied to a high-capacity secondary battery for electric vehicles in addition to a compact secondary battery, and has been spotlighted as a next-generation battery.

Meanwhile, in the case of a battery using a solid electrolyte, its electrodes and polymer-based separator (membrane) are totally in a solid state and it includes no liquid electrolyte. Thus, a void generated at the interface between an electrode and a separator is present as a dead space. Particularly, when the electrode surface is irregular due to the shape of an active material, aggregation of a conductive material and swelling of a binder, more voids are generated to cause an increase in resistance between an electrode and a separator, thereby adversely affecting the life characteristics of a battery.

In addition, it is known that cracking in a positive electrode active material is one of the causes of life degradation well-known in the field of conventional lithium ion secondary batteries, occurs from the initial stage of cycles, and occurs under any conditions regardless of the type of an active material and electric potential. In the case of a solid electrolyte battery using a solid electrolyte, the electrolyte cannot infiltrate into the cracks of a positive electrode generated during the progress of cycles, unlike a battery using a liquid electrolyte. As a result, paths required for ion conduction are broken to cause a problem of rapid degradation of the life of a battery.

To solve the above-mentioned problem, many attempts have been made to add a liquid ion conductive material (or electrolyte) in a solid electrolyte battery so that the interface between an electrode and a separator may be filled therewith. To use such a liquid material, a liquid injection step is to be carried out after the assemblage of a cell. However, there is a disadvantage in that an excessive amount of a liquid material should be injected so that it may be present at the interface between a separator and an electrode.

To overcome this, a liquid material, such as an electrolyte or additive, may be absorbed preliminarily into a polymer-based separator. Then, the polymer-based separator to which the electrolyte is absorbed may be softened to reduce the interfacial resistance between a separator and an electrode. However, the softened separator has poor mechanical properties, thereby making it difficult to perform assemblage, and makes the adhesion between an electrode active material and a current collector weak. As a result, there is a difficulty in practical application of the above-mentioned method.

DISCLOSURE

Technical Problem

The present disclosure is designed to solve the problems of the related art, and therefore the present disclosure is directed to providing a positive electrode for a solid electrolyte battery, which allows a liquid material to be present only in an electrode so as to soften a separator, with no separate liquid injection step of an electrolyte, thereby improving the performance of a battery by retaining the adhesion between an electrode active material and a current collector, while reducing the interfacial resistance between a separator and an electrode, and enables infiltration of an electrolyte into the cracks formed in a positive electrode active material even in a solid electrolyte battery system, like in a liquid electrolyte battery. The present disclosure is also directed to providing a solid electrolyte battery or all solid state battery including the positive electrode.

Technical Solution

In one aspect of the present disclosure, there is provided a positive electrode for a solid electrolyte battery according to any one of the following embodiments.

According to the first embodiment, there is provided a positive electrode for a solid electrolyte battery which includes:

a positive electrode current collector;

a first positive electrode active material layer formed on at least one surface of the positive electrode current collector and including a first positive electrode active material, a first solid electrolyte and a first electrolyte salt; and a second positive electrode active material layer formed on the first positive electrode active material layer and including a second positive electrode active material, a second solid electrolyte, a second electrolyte salt and a plasticizer, wherein the plasticizer has a melting point of 30-130° C.

According to the second embodiment, there is provided the positive electrode for a solid electrolyte battery as defined in the first embodiment, wherein the plasticizer has a melting point of 35-65° C.

According to the third embodiment, there is provided the positive electrode for a solid electrolyte battery as defined in the first or the second embodiment, wherein the plasticizer is ethylene carbonate (EC), polyethylene glycol (PEG) having a weight average molecular weight of 1,000 or more, succinonitrile (SN), cyclic phosphate (CP) or at least two of them.

According to the fourth embodiment, there is provided the positive electrode for a solid electrolyte battery as defined in any one of the first to the third embodiments, wherein the plasticizer is used in an amount of 0.1-30 wt % based on the total weight of the second positive electrode active material layer.

According to the fifth embodiment, there is provided the positive electrode for a solid electrolyte battery as defined in any one of the first to the fourth embodiments, wherein each of the first positive electrode active material layer and the second positive electrode active material layer further includes a conductive material and a binder.

According to the sixth embodiment, there is provided the positive electrode for a solid electrolyte battery as defined in any one of the first to the fifth embodiments, wherein the weight ratio of the first positive electrode active material layer to the second positive electrode active material layer is 1:99-99:1.

In another aspect of the present disclosure, there is also provided a sold electrolyte battery according to any one of the following embodiments.

According to the seventh embodiment, there is provided a solid electrolyte battery including a positive electrode, a negative electrode and a separator interposed between the positive electrode and the negative electrode, wherein the positive electrode is the positive electrode for a solid electrolyte battery as defined in any one of the first to the sixth embodiments.

According to the eighth embodiment, there is provided the solid electrolyte battery as defined in the seventh embodiment, which is activated at a temperature between the melting point of the plasticizer and 130° C., and the plasticizer is present in a liquid state after the solid electrolyte battery is activated.

According to the ninth embodiment, there is provided the solid electrolyte battery as defined in the seventh or the eighth embodiment, wherein the liquid-state plasticizer infiltrates into the cracks formed in the second positive electrode active material.

According to the tenth embodiment, there is provided the solid electrolyte battery as defined in any one of the seventh to the ninth embodiments, wherein the separator is a solid electrolyte membrane, and the negative electrode is lithium metal.

According to the eleventh embodiment, there is provided the solid electrolyte battery as defined in any one of the seventh to the tenth embodiments, wherein the voids in the second positive electrode active material layer are filled with the liquid-state plasticizer In still another aspect of the present disclosure, there is provided a battery module or battery pack according to any one of the following embodiments.

According to the twelfth embodiment, there is provided a battery module including the solid electrolyte battery as defined in any one of the seventh to the eleventh embodiments as a unit cell.

According to the thirteenth embodiment, there is provided a battery pack including the battery module as defined in the twelfth embodiment.

Advantageous Effects

According to an embodiment of the present disclosure, since the first positive electrode active material layer facing the positive electrode current collector includes no plasticizer, no softening of the solid electrolyte occurs so that the mechanical properties of the active material layer may be maintained and the adhesion to the positive electrode current collector may be retained. In addition, since the second positive electrode active material layer facing the separator includes a plasticizer, softening of the solid electrolyte occurs to reduce the interfacial resistance between the active material layer and the separator.

Further, the specific plasticizer contained in the second positive electrode active material layer infiltrates into the cracks of the positive electrode active materials generated during the progress of cycles of a solid electrolyte battery, thereby imparting ion conductivity even to the inner part of the cracks.

Therefore, paths required for ion conduction according to the cracking of the positive electrode active material are retained to prevent degradation of life characteristics of a solid electrolyte battery.

In addition, the plasticizer used according to the present disclosure has high ion conductivity, and thus can further improve the output characteristics of a battery. Further, the plasticizer has oxidation reactivity higher than the electric potential applicable to a positive electrode, and thus may be used stably in a positive electrode.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
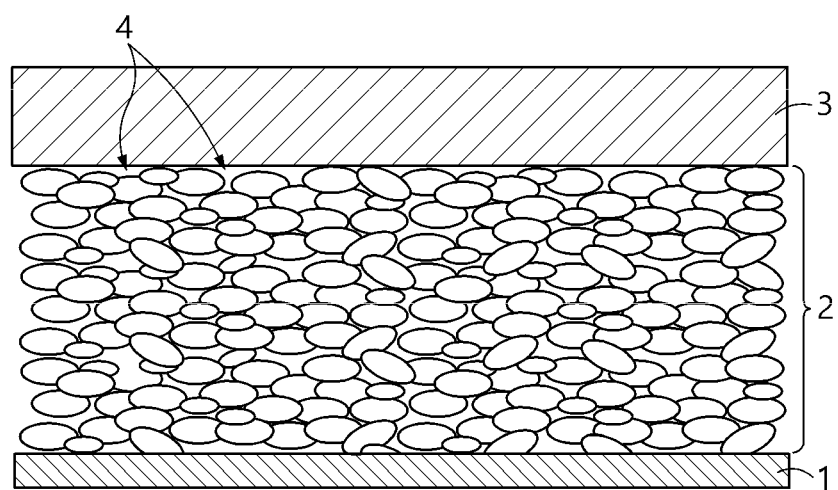
FIG. 1 is a schematic sectional view illustrating the positive electrode using the conventional solid electrolyte.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

In one aspect of the present disclosure, there is provided a positive electrode for a solid electrolyte battery which includes: a positive electrode current collector; a first positive electrode active material layer formed on at least one surface of the positive electrode current collector and including a first positive electrode active material, a first solid electrolyte and a first electrolyte salt; and a second positive electrode active material layer formed on the first positive electrode active material layer and including a second positive electrode active material, a second solid electrolyte, a second electrolyte salt and a plasticizer, wherein the plasticizer has a melting point of 30-130° C.

Since the plasticizer has a melting point of 30-130° C., it is present in a solid state at room temperature of about 15-25° C. Meanwhile, the plasticizer is converted into a liquid state at a temperature equal to or higher than its melting point and has fluidity. The plasticizer phase-transformed into a liquid state may infiltrate into the cracks formed in the second positive electrode active material.

In general, once a battery is manufactured, the battery is finished as commercially available one after being subjected to an activation step.

Herein, the high-temperature activation step should be carried out at a temperature equal to or higher than the melting point of the plasticizer. The activation step may be carried out by allowing a battery to stand for a predetermined time at a temperature higher than room temperature, for example 30° C. or higher, preferably 35° C. or higher, and more preferably 50° C. or higher, and 130° C. or lower, preferably 100° C. or lower, and more preferably 90° C. or lower, while the battery is charged/discharged or not.

The predetermined time may be 10 seconds to 48 hours, preferably 1 minute to 24 hours, more preferably about 1-8 hours.

Meanwhile, when the activation temperature is higher than 130° C., the binder that may be contained in the electrode active material layer may be cured, thereby making it difficult to realize performance as an electrode. Therefore, the activation temperature should be 130° C. or lower. Accordingly, the plasticizer should have a melting point of 130° C. or lower.

According to the present disclosure, after a solid electrolyte battery including the above-described positive electrode, a separator and a negative electrode is manufactured, it is subjected to an activation step. Herein, the high-temperature activation step may be carried out by allowing the battery to stand at a temperature between the melting point of the plasticizer and 130° C. for a predetermined time, such as 10 seconds to 48 hours, while the battery is not charged/discharged.

Meanwhile, in general, cracking occurs in a positive electrode active material during the progress of battery cycles. According to the present disclosure, the plasticizer is transformed into a liquid phase through the above-mentioned high-temperature activation step, and then infiltrates into the cracks formed in the second positive electrode active material during the progress of battery cycles. Thus, in the same manner as a liquid electrolyte battery, it is possible to impart ion conductivity to the inner part of the cracks. As a result, it is possible to prevent degradation of life characteristics of a solid electrolyte battery.

Particularly, according to the present disclosure, the first positive electrode active material layer facing the positive electrode current collector includes no plasticizer and the second positive electrode active material layer facing the separator includes a plasticizer.

Figure 2:
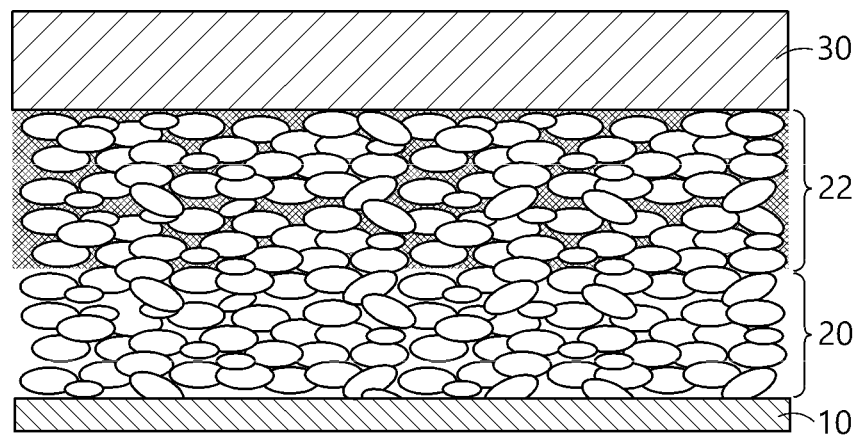
FIG. 2 is a schematic sectional view illustrating the positive electrode using the solid electrolyte according to an embodiment of the present disclosure.

FIG. 1 is a schematic sectional view illustrating the positive electrode using the conventional solid electrolyte, and FIG. 2 is a schematic sectional view illustrating the positive electrode using the solid electrolyte according to an embodiment of the present disclosure. Referring to FIG. 1, in the case of the battery using the conventional solid electrolyte, voids 4 present at the interface between a positive electrode active material layer 2 and a separator 3 are present as a dead space having no ion conductivity. Particularly, when the electrode surface is irregular due to the shape of an active material, aggregation of a conductive material and swelling of a binder, more voids are generated to cause an increase in resistance between the electrode and the separator, thereby adversely affecting life characteristics of a battery.

However, according to the present disclosure, referring to FIG. 2, no softening of the solid electrolyte occurs in the first positive electrode active material layer 20 so that the active material layer may retain mechanical properties and the physical adhesion to a current collector 10 may be retained. In the second positive electrode active material layer 22, softening of the solid electrolyte occurs to reduce the interfacial resistance between the second positive electrode active material layer 22 and the separator 30.

The plasticizer is characterized in that it has a melting point of 30-130° C., preferably 35-65° C. More particularly, the plasticizer may be any material, as long as it is present in a solid state at room temperature but is transformed into a liquid state at high temperature. Specifically, the plasticizer may be ethylene carbonate (EC) having a melting point of about 37° C., polyethylene glycol (PEG) having a weight average molecular weight of 1,000 or more and a melting point of about 35° C., succinonitrile (SN) having a melting point of about 57° C., cyclic phosphate (CP) having a melting point of about 65° C., or at least two of them.

Meanwhile, since propylene carbonate (PC) having a melting point of about −49° C., polyethylene glycol (PEG) having a weight average molecular weight of 600 or less, polyethylene glycol dimethyl ether (PEGDME) having a melting point of about −23° C., dioctyl phthalate (DOP) having a melting point of about −50° C., and diethyl phthalate (DEP) having a melting point of about −4° C. are present in a liquid state at room temperature, they cannot be applied as a plasticizer according to the present disclosure.

As one examples of the plasticizer according to the present disclosure, ethylene carbonate has a melting point of about 37° C. The second positive electrode active material slurry containing ethylene carbonate has a melting point slightly higher than the melting point of ethylene carbonate but is prepared at a temperature lower than the subsequent activation temperature. Thus, ethylene carbonate can be present in a liquid state in the slurry, and thus ethylene carbonate can be dispersed homogeneously in the slurry. When the slurry is coated and dried on the first positive electrode active material layer subsequently, the dispersion medium is removed through evaporation, but ethylene carbonate remains without evaporation and is transformed into a solid state at room temperature so that it may be distributed homogeneously around the second positive electrode active material. Herein, since drying of the second positive electrode active material slurry is carried out by vacuum drying at a temperature equal to or lower than the melting point of ethylene carbonate, preferably at room temperature, ethylene carbonate is not transformed into a liquid state but is present in a solid state.

In addition, the solid electrolyte battery including the second positive electrode active material layer prepared from the second positive electrode active material slurry is exposed to a high temperature higher than 37° C., the melting point of ethylene carbonate, through the high-temperature activation step. Thus, ethylene carbonate distributed around the second positive electrode active material is transformed into a liquid state again and reacts with the electrolyte salt in the positive electrode, and then is present in a liquid state subsequently even at a temperature of 37° C. or lower. While the battery repeats cycles, cracking occurs in the positive electrode active material and ethylene carbonate infiltrates into the cracks, thereby imparting ion conductivity to the inner part of the cracks in the same manner as a liquid electrolyte battery. As a result, it is possible to prevent degradation of life characteristics of the solid electrolyte battery.

Further, ethylene carbonate transformed into a liquid state reacts with the second solid electrolyte, thereby softening the second solid electrolyte. The softened second positive electrode active material layer has high ion conductivity by itself and is attached well to the separator to reduce the interfacial resistance between the second positive electrode active material layer and the separator.

Ethylene carbonate is used for the conventional non-aqueous electrolyte and is advantageous in that it may be applied to most batteries and has no impurities. Particularly, such ethylene carbonate has high ion conductivity and thus can further improve the output characteristics of the battery. In addition, ethylene carbonate has oxidation reactivity (6.2V) higher than the electric potential applicable to the positive electrode, and thus can be used stably in the positive electrode.

In addition to ethylene carbonate, polyethylene glycol having a weight average molecular weight of 1,000 or more, succinonitrile (SN) and cyclic phosphate (CP) used as a plasticizer according to the present disclosure can provide effects similar to the above-described effects of ethylene carbonate. Herein, the temperature at which the second positive electrode active material slurry is prepared and the temperature in the subsequent battery activation step may be varied with the type of plasticizer, and may be selected suitably depending on the melting point of a plasticizer.

Meanwhile, the plasticizer may be used in an amount of 0.1-30 wt %, 0.5-25 wt %, or 0.7-20 wt %, based on the total weight of the second positive electrode active material layer.

When the plasticizer is used in an amount less than the above-defined range, it is not possible to provide the effects of plasticizer sufficiently. When the plasticizer is used in an amount larger than the above-defined range, the resultant battery becomes similar to a battery using a liquid electrolyte and improvement of safety is not sufficient.

In addition, the plasticizer may be dissolved and dispersed in a liquid state in the second positive electrode active material slurry, or may be dispersed in a solid state.

Meanwhile, according to the present disclosure, the first positive electrode active material or the second positive electrode active material may be any material, as long as it can be used as a positive electrode active material for a lithium secondary battery. Particular examples of the positive electrode active material include, but are not limited to: layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); lithium manganese composite oxides having a spinel structure and represented by the formula of $LiN i_xMn_{2-x}O_4$; $LiMn_2O_4$ in which Li is partially substituted with an alkaline earth metal ion; disulfide compounds; $Fe_2(MoO_4)_3$; $LiNi_{0.8}Co_{0.1}Mn_{0.1}O_2$; or the like.

Meanwhile, the first positive electrode active material and the second positive electrode active material may satisfy a weight ratio of 1:99-99:1, preferably 30:70-70:30, and more preferably 30:70-50:50. It is possible to modify the performance of a battery suitably by varying the ratio of the positive electrode active material layers.

In addition, the first positive electrode active material layer and the second positive electrode active material layer may include a different positive electrode active material, may further include a different type of conductive material and binder, and may have a different compositional ratio of the ingredients.

Meanwhile, the first positive electrode active material layer or the second positive electrode active material layer may further include a conductive material and binder depending on the type of solid electrolyte or desired performance. Herein, the conductive material may be used in an amount of 0.1-20 wt %, preferably 1-10 wt %, based on the total weight of the first and the second positive electrode active material layers. In addition, the binder may be used in an amount of 0.1-20 wt %, preferably 1-10 wt %, based on the total weight of the first and the second positive electrode active material layers.

The conductive material is not particularly limited, as long as it causes no chemical change in the corresponding battery and has conductivity. For example, the conductive material include any one selected from: graphite, such as natural graphite or artificial graphite; carbon black, such as acetylene black, electro-conductive carbon black, channel black, furnace black, lamp black or thermal black; conductive fibers, such as carbon fibers or metallic fibers; metal powder, such as carbon fluoride, aluminum or nickel powder; conductive whisker, such as zinc oxide or potassium titanate; conductive metal oxide, such as titanium oxide; and conductive materials, such as polyphenylene derivatives, or a mixture of two or more of them.

In addition, particular examples of the binder include various types of binders, such as polyvinylidene fluoride-co-hexafluoropropylene (PVDF-co-HFP), polyvinylidene fluoride (PVDF), polyacrylonitrile, polymethyl methacrylate, styrene-butadiene rubber (SBR), carboxymethyl cellulose (CMC), or the like.

In addition, it is preferred to use a solid electrolyte having excellent oxidation stability according to the present disclosure. Since the solid electrolyte mainly functions to transport lithium ions in the electrodes according to the present disclosure, any solid electrolyte having high ion conductivity, such as $10^{-5}$ S/cm or more, preferably $10^{-4}$ S/cm or more, may be used with no particular limitation.

Herein, the solid electrolyte may be a polymer solid electrolyte formed by adding a polymer resin to a solvated electrolyte salt, an organic electrolyte containing an organic solvent and an electrolyte salt, or a polymer gel electrolyte formed by incorporating an ionic liquid, monomer or oligomer to a polymer resin. In addition, the solid electrolyte may be a sulfide-based solid electrolyte having high ion conductivity or an oxide-based solid electrolyte having high stability.

For example, the polymer solid electrolyte may include a polyether polymer, polycarbonate polymer, acrylate polymer, polysiloxane polymer, phosphazene polymer, polyethylene derivatives, alkylene oxide derivatives, phosphate polymer, polyagitation lysine, polyester sulfide, polyvinyl alcohol, polyvinylidene fluoride, polymer containing an ionically dissociable group, or the like. In addition, the polymer solid electrolyte may include a polymer resin, such as a branched copolymer including polyethylene oxide (PEO) backbone copolymerized with a comonomer including an amorphous polymer, such as PMMA, polycarbonate, polydiloxane (pdms) and/or phosphazene, comb-like polymer, crosslinked polymer resin, or the like, and may be a mixture of such polymers.

In addition, the polymer gel electrolyte includes an electrolyte salt-containing organic electrolyte and a polymer resin, wherein the organic electrolyte is used in an amount of 60-400 parts by weight based on the weight of the polymer resin. There is no particular limitation in the polymer used for the gel electrolyte, and particular examples of the polymer include polyether polymers, PVC polymers, PMMA polymers, polyacrylonitrile (PAN), polyvinylidene fluoride (PVDF), polyvinylidene fluoride-co-hexafluoropropylene: PVDF-co-HFP), or the like. In addition, a mixture of such polymers may be used.

In addition, the electrolyte salt is an ionizable lithium salt and may be represented by $Li^+X^-$. Preferably, the lithium salt may be any one selected from the group consisting of LiTFSI, LiCl, LiBr, LiI, $LiClO_4$, $LiBF_4$, $LiB_{10}Cl_{10}$, $LiPF_6$, $LiAsF_6$, $LiSbF_6$, $LiAlCl_4$, LiSCN, $LiCF_3CO_2$, $LiCH_3SO_3$, $LiCF_3SO_3$, $LiN(SO_2CF_3)_2$, $LiN(SO_2C_2F_5)_2$, $LiC_4F_9SO_3$, $LiC(CF_3SO_2)_3$, $(CF_3SO_2).2NLi$, lithium chloroborate, lithium lower aliphatic carboxylate, lithium imide 4-phenylborate and combinations thereof. More preferably, the electrolyte salt may be lithium bistrifluoromethanesulfonamide (LiTFSI).

In addition, the dispersion medium for the positive electrode active material slurry according to the present disclosure is not particularly limited, as long as it is used currently for preparing positive electrode active material slurry. Particularly, the dispersion medium may be isopropyl alcohol, N-methyl pyrrolidone (NMP), acetone, water, or the like.

Meanwhile, the positive electrode for a solid electrolyte battery according to the present disclosure is obtained by coating the first positive electrode active material slurry onto a positive electrode current collector, followed by drying, to form the first positive electrode active material layer, and then coating the second positive electrode active material slurry onto the first positive electrode active material layer, followed by drying, to provide a positive electrode having the first and the second positive electrode active material layers.

Herein, the coating may be carried out by using any known coating process, such as slot die coating, gravure coating, spin coating, spray coating, roll coating, curtain coating, extrusion, casting, screen printing, inkjet printing, or the like.

In addition, the positive electrode active material slurry may be dried by irradiating heat, electron beams (E-beams), gamma rays, or UV (G, H, I-line), or the like, to vaporize the solvent. Preferably, the second positive electrode active material slurry may be vacuum dried at room temperature. It is possible for the plasticizer to be present in a solid state, not a liquid state, through the vacuum drying at room temperature.

Although the dispersion is removed through evaporation by the drying step, the other ingredients do not evaporate and remain as they are to form a positive electrode active material layer.

In addition, according to the present disclosure, the positive electrode current collector may be a metal plate having conductivity, and may be selected suitably depending on the polarity of an electrode used therewith as known in the field of secondary batteries.

In another aspect of the present disclosure, there is also provided a solid electrolyte battery including a positive electrode, a negative electrode and a separator interposed between the positive electrode and the negative electrode, wherein the positive electrode is the positive electrode for a solid electrolyte battery according to the present disclosure.

To make the solid electrolyte battery commercially available, it should be subjected to a high-temperature activation step. Herein, as mentioned above, the high-temperature activation step may be carried out by allowing the battery to stand at a temperature between the melting point of the plasticizer and 130° C. for a predetermined time, i.e. for 10 seconds to 48 hours, while it is not charged/discharge.

After the activation step, the plasticizer is transformed into a liquid state. Then, the liquid-state plasticizer present around the second positive electrode active material infiltrates into the cracks formed in the second positive electrode active material during the progress of cycles. Thus, it is possible to impart ion conductivity to the inner part of the cracks in the same manner as a liquid electrolyte battery. As a result, it is possible to prevent degradation of the life characteristics of a solid electrolyte battery.

In addition, the negative electrode may include any negative electrode active material used conventionally as a negative electrode active material for a lithium secondary battery with no particular limitation. For example, the negative electrode active material may include at least one selected from: carbon such as non-graphitizable carbon, graphitic carbon (natural graphite, artificial graphite), or the like; metal composite oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb or Ge; Me': Al, B, P, Si, an element of Group 1, Group 2 or Group 3 in the Periodic Table, or halogen; $0 < x \leq 1$; $1 \leq y \leq 3$; $1 \leq z \leq 8$); lithium metal; lithium alloys; silicon-based alloys; tin-based alloys; metal oxides such as SnO, $SnO_2$, PbO, $PbO_3$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, or the like; conductive polymers such as polyacetylene; Li—Co—Ni based materials; titanium oxide; lithium titanium oxide, or the like. According to an embodiment of the present disclosure, the negative electrode active material may include a carbonaceous material and/or Si.

Particularly, the present disclosure is advantageous in that high energy density can be obtained by using lithium metal or lithium alloys as a negative electrode active material for a negative electrode.

In addition, the separator is interposed between the negative electrode and the positive electrode and functions to electrically insulate the negative electrode and the positive electrode from each other while allowing lithium ions to pass therethrough. The separator may be any solid electrolyte membrane used conventionally in the field of solid electrolyte batteries with no particular limitation.

For example, the solid electrolyte membrane may be a polymer solid electrolyte membrane, oxide-based solid electrolyte membrane, or a sulfide-based solid electrolyte membrane.

According to an embodiment of the present disclosure, the polymer solid electrolyte may include a polyether polymer, polycarbonate polymer, acrylate polymer, polysiloxane polymer, phosphazene polymer, polyethylene derivatives, alkylene oxide derivatives, phosphate polymer, polyagitation lysine, polyester sulfide, polyvinyl alcohol, polyvinylidene fluoride, polymer containing an ionically dissociable group, or the like.

According to an embodiment of the present disclosure, the sulfide-based solid electrolyte includes Li, X and S, wherein X may include at least one of P, Ge, B, Si, Sn, As, Cl, F or I.

According to an embodiment of the present disclosure, the oxide-based solid electrolyte includes Li, A and O, wherein A may include at least one of La, Zr, Ti, Al, P or I.

According to an embodiment of the present disclosure, the solid electrolyte membrane may further include a lithium salt.

According to an embodiment of the present disclosure, the lithium salt include $Li^+$ as cation, and may include, as anion, at least one of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $F_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, or $(CF_3CF_2SO_2)_2N^-$.

Meanwhile, in still another aspect of the present disclosure, there is provided a battery module including the lithium secondary battery as a unit cell, a battery pack including the battery module, and a device including the battery pack as a power source.

Herein, particular examples of the device may include, but are not limited to: electric vehicles, hybrid electric vehicles, plug-in hybrid electric vehicles, or electric power storage systems.

Hereinafter, the present disclosure will be explained in detail with reference to examples. However, the following examples are for illustrative purposes only and the scope of the present disclosure is not limited thereto.

1. Example 1

(1) Manufacture of Positive Electrode

First, 2 parts by weight of polyvinylidene fluoride (PVDF) as a binder was dissolved in acetonitrile as a solvent to prepare a binder solution, and 3 parts by weight of carbon black (Super C65) as a conductive material was introduced to the binder solution to obtain a mixed solution.

Next, 80 parts by weight of $LiNi_{0.8}Co_{0.1}Mn_{0.1}O_2$ (NCM811) as the first positive electrode active material, 9 parts by weight of polyethylene oxide (PEO) as the first solid electrolyte and 5 parts by weight of bis-trifluoromethane-sulfonimide (LITFSI) as the first electrolyte were mixed at 60° C. to obtain homogeneous the first positive electrode active material slurry.

Then, slurry was prepared in the same manner as the first positive electrode active material slurry, and 1 part by weight of ethylene carbonate (melting point: 37° C.) as a plasticizer was further introduced thereto at room temperature and mixed. After that, additional solvent was added thereto considering the viscosity to obtain the second positive electrode active material slurry.

The first positive electrode active material slurry was applied to an aluminum current collector having a thickness of 20 μm and vacuum-dried at 120° C. for 24 hours to form the first positive electrode active material layer having a thickness of 30 μm.

Then, the second positive electrode active material slurry was applied onto the first positive electrode active material layer and vacuum-dried at room temperature for 24 hours to form the second positive electrode active material layer having a thickness of 80 μm, thereby providing a positive electrode.

Herein, the first positive electrode active material layer and the second positive electrode active material layer were controlled to a weight ratio of about 30:70.

After drying, ethylene carbonate in the second positive electrode active material layer was present in a solid state at room temperature.

(2) Manufacture of Battery

The positive electrode obtained as described above and a lithium metal negative electrode were used to obtain a coin-type half-cell. Particularly, a polymer separator membrane, i.e. a polymer solid electrolyte membrane (PEO+ Lithium bis (fluorosulfonyl) imide (LiFSI), 20:1 (molar ratio)) having a thickness of 50 μm was interposed between the positive electrode and the negative electrode to obtain a half-cell.

(3) High-Temperature Activation Step of Battery

The obtained battery was stored at 60° C. for 10 minutes. After that, ethylene carbonate used as a plasticizer was transformed into a liquid state.

2. Example 2

A positive electrode and a battery were obtained in the same manner as Example 1, except that 9.5 parts by weight of polyethylene oxide was used instead of 9 parts by weight of polyethylene oxide as the first and the second solid electrolytes, and 0.5 parts by weight of succinonitrile (melting point: 57° C.) was mixed instead of 1 part by weight of ethylene carbonate as a plasticizer incorporated to the second positive electrode active material slurry. After drying, succinonitrile contained in the second positive electrode active material layer was present in a solid state at room temperature.

Next, under the same condition as Example 1, the battery was subjected to a high-temperature activation step. Then, succinonitrile was transformed into a liquid state.

3. Comparative Example

A positive electrode and a battery were obtained in the same manner as Example 1, except that the second positive electrode active material slurry includes no ethylene carbonate as a plasticizer.

Then, the battery was subjected to a high-temperature activation step under the same condition as Example 1.

4. Determination of Capacity Retention of Battery

Figure 3:
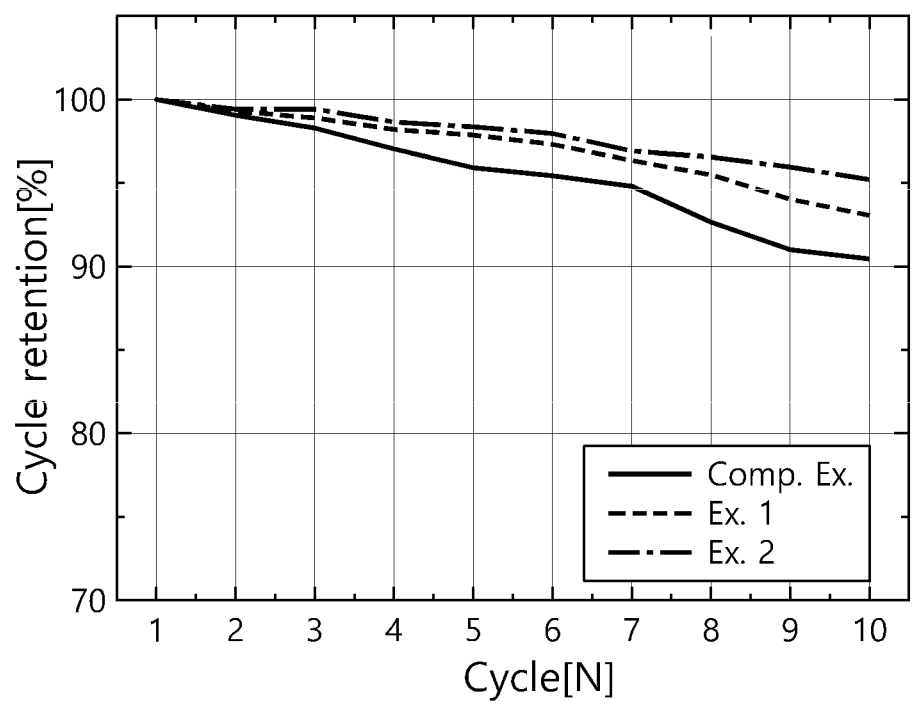
FIG. 3 is a graph illustrating the capacity retention of each of the coin cells according to Examples 1 and 2 and Comparative Example.

Each of the batteries according to Examples 1 and 2 and Comparative Example was charged/discharged and the capacity retention was determined. The results are shown in FIG. 3. Herein, charge/discharge was carried out at a temperature of 25° C. and 0.05C, wherein the charge voltage was 4.25V and the discharge voltage was 3.0V.

Referring to FIG. 3, while the batteries repeat charge/discharge cycles, the batteries according to Examples show higher capacity retention as compared to Comparative Example and the difference in capacity retention tends to increase as the cycle number is increased.

The present disclosure has been described in detail with reference to particular embodiments and drawings. However, it should be understood that the detailed description and specific examples, while indicating preferred embodiments of the disclosure, are given by way of illustration only, since various changes and modifications within the scope of the disclosure will become apparent to those skilled in the art from this detailed description.

DESCRIPTION OF DRAWING NUMERALS 1, 10: Current collector
2: Positive electrode active material layer
3, 30: Separator
4: Void
20: First positive electrode active material layer
22: Second positive electrode active material layer

What is claimed is:

1. A positive electrode for a solid electrolyte battery which comprises:
a positive electrode current collector;
a first positive electrode active material layer formed on at least one surface of the positive electrode current collector and comprising a first positive electrode active material, a first solid electrolyte and a first electrolyte salt, and
the first positive electrode active material layer comprises no plasticizer; and
a second positive electrode active material layer formed on the first positive electrode active material layer and comprising a second positive electrode active material, a second solid electrolyte, a second electrolyte salt and a plasticizer, and
the plasticizer has a melting point of 30-130° C.

2. The positive electrode for a solid electrolyte battery according to claim 1, wherein the plasticizer has a melting point of 35-65° C.

3. The positive electrode for a solid electrolyte battery according to claim 1, wherein the plasticizer is used in an amount of 0.1-30 wt % based on the total weight of the second positive electrode active material layer.

4. The positive electrode for a solid electrolyte battery according to claim 1, wherein each of the first positive electrode active material layer and the second positive electrode active material layer further comprises a conductive material and a binder.

5. The positive electrode for a solid electrolyte battery according to claim 1, wherein the weight ratio of the first positive electrode active material layer to the second positive electrode active material layer is 1:99-99:1.

6. The positive electrode for a solid electrolyte battery according to claim 1, wherein the first solid electrolyte and the second solid electrolyte are each a polymer solid electrolyte, an organic electrolyte, or a polymer gel electrolyte.

7. The positive electrode for a solid electrolyte battery according to claim 1, wherein the plasticizer is ethylene carbonate (EC), polyethylene glycol (PEG) having a weight average molecular weight of 1,000 or more, succinonitrile (SN), cyclic phosphate (CP), or at least two of them.

8. A solid electrolyte battery comprising a positive electrode, a negative electrode and a separator interposed between the positive electrode and the negative electrode, wherein the positive electrode is the positive electrode for a solid electrolyte battery as defined in claim 1.

9. The solid electrolyte battery according to claim 8, wherein the separator comprises a solid electrolyte membrane, and the negative electrode comprises lithium metal.

10. The solid electrolyte battery according to claim 8, which is activated at a temperature between the melting point of the plasticizer and 130° C., and the plasticizer is present in a liquid state after the solid electrolyte battery is activated.

11. The solid electrolyte battery according to claim 10, wherein the plasticizer in the liquid state infiltrates into cracks formed in the second positive electrode active material.

12. The solid electrolyte battery according to claim 10, wherein voids in the second positive electrode active material layer are filled with the plasticizer in the liquid state.

13. A battery module comprising the solid electrolyte battery as defined in claim 8 as a unit cell.

14. A battery pack comprising the battery module as defined in claim 13.

* * * * *